(No Model.)  2 Sheets—Sheet 1.
G. T. BEILBY.
SEPARATING SOLID PARAFFINE FROM OILS.

No. 344,709. Patented June 29, 1886.

(No Model.) 2 Sheets—Sheet 2.

G. T. BEILBY.
SEPARATING SOLID PARAFFINE FROM OILS.

No. 344,709. Patented June 29, 1886.

UNITED STATES PATENT OFFICE.

GEORGE THOMAS BEILBY, OF MIDCALDER, COUNTY OF MID-LOTHIAN, SCOTLAND.

SEPARATING SOLID PARAFFINE FROM OILS.

SPECIFICATION forming part of Letters Patent No. 344,709, dated June 29, 1886.

Application filed July 20, 1885. Serial No. 172,144. (No model.)

*To all whom it may concern:*

Be it known that I, GEORGE THOMAS BEILBY, of Midcalder, in the county of Mid-Lothian, Scotland, chemical engineer, have invented Improvements in Separating Solid Paraffine from Oils, of which the following is a specification.

My invention relates to apparatus for cooling and crystallizing paraffine-oils in a state of repose, and has reference also to the breaking up of the solidified mass and feeding the same to the filter-presses or other appliances used for separating the solid portions of paraffine from the liquid portions.

The apparatus constituting the invention in its simplest or unit form consists of a narrow vertical cell whose outer walls are exposed to the cooling influence of the air or other medium. In the lower part of such cell there is arranged horizontally and longitudinally a rotating screw or its equivalent, which by its rotation so acts upon the solidified mass of paraffine in the cell that it breaks it up and discharges it continuously into pipes or other receptacles leading to the filter-press or other separating apparatus. For the purposes of manufacture, any required number of such units are put together in blocks or batteries, sufficient free space being left between each pair of them to allow of the free circulation or passage of the cooling medium.

Figure 1:
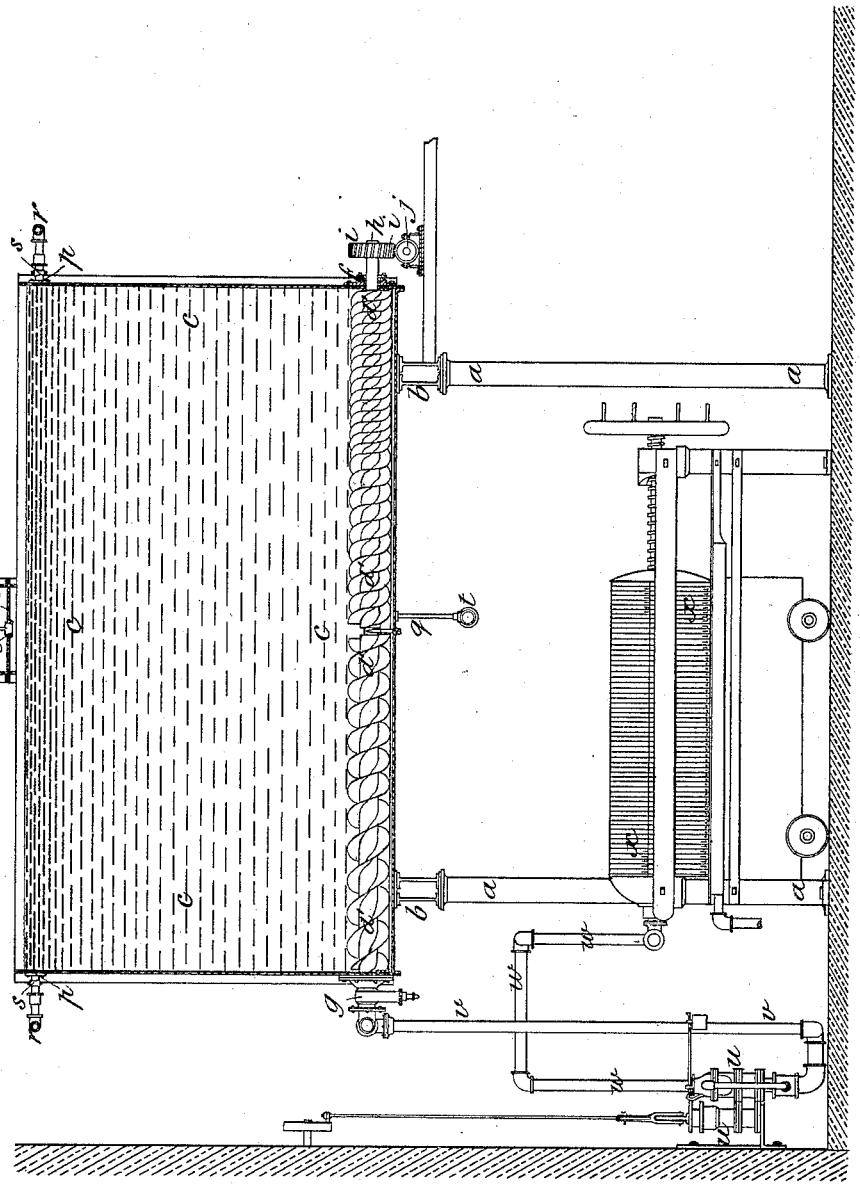
Figure 2:
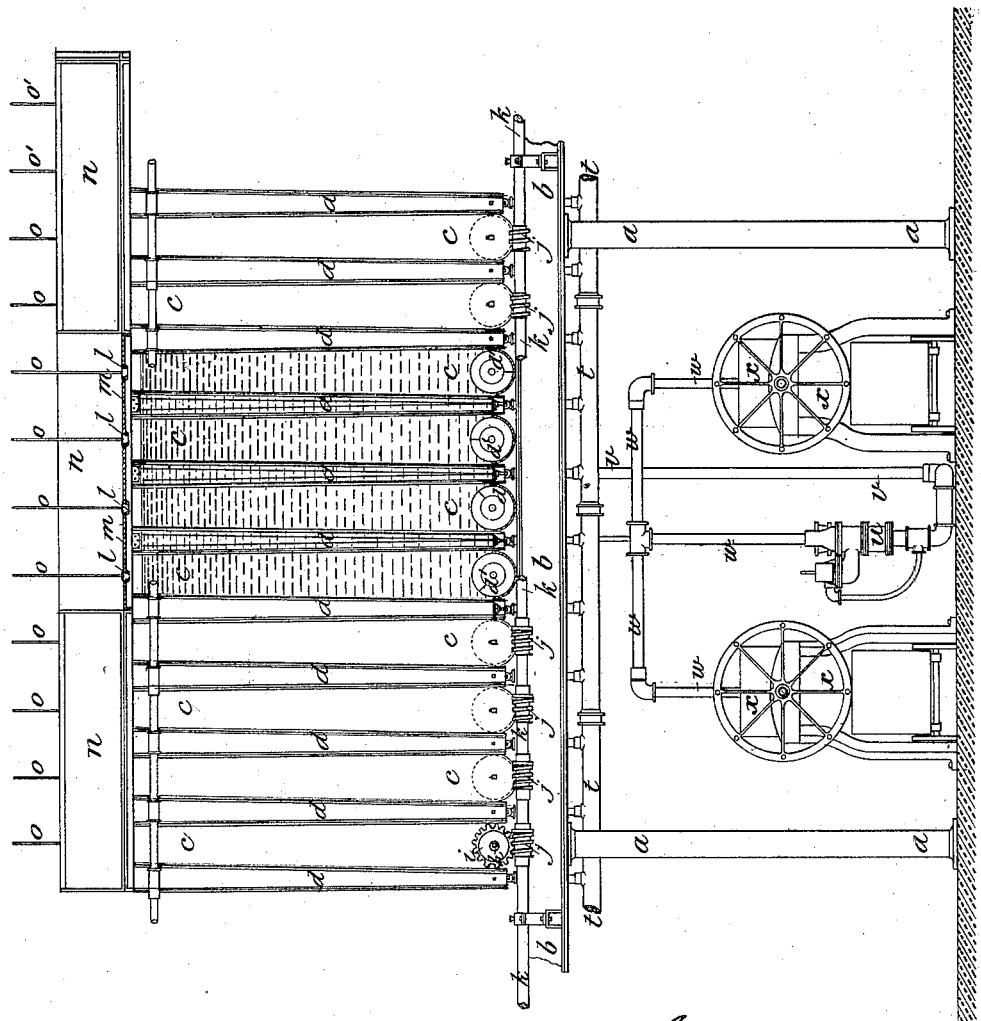

In the drawings, Figure 1 is an end elevation of the apparatus constituting my invention, and wherein one of the cooling cells or units is shown in section. Fig. 2 is a front elevation with parts shown in section and corresponding to Fig. 1.

The apparatus, as shown by these figures, is supported on girders $b$, carried upon the columns $a$, or it may be otherwise suitably supported.

The unit of apparatus consists of a cell, $c$, having other cells, $d$, on the sides thereof for the purpose of absorbing the heat from the liquid paraffine undergoing cooling in repose in the cell $c$. Upon the annexed drawings I have represented, and hereinafter I have described, a battery consisting of a series of such cells each corresponding to such unit-cell. The paraffine-containing cells $c$ are each provided at their lower ends with a rotating screw or helical cutter, $d'$, the shaft of which is supported at one end in a liquid-tight bearing, $f$, the other end being carried in the discharge-orifice. The pitch of each such rotating screw or helical cutter $d'$ is varied in sections extending in the direction of its length—that is to say, that section thereof nearest to the outlet-valve $g$, Fig. 1, is quickest, and that section thereof farthest from the said valve $g$ is of least pitch or slowest in progression, while the sections of the said rotating screw or helical cutter intervening between these extremes are graduated accordingly. This variation of the pitch of the rotating screws or helical cutters $d'$ is the means of avoiding any jamming of the solid portions of the paraffine in their discharge from the cells $c$, as each graduated section thereof has to discharge the matter passed forward to it from the preceding sections—that is to say, the sections behind it. Upon the end $h$ of the shaft of each such screw or helical cutter there is secured a worm-wheel, $i$, which engages with a worm or tangent screw, $j$, each of which is carried upon the shaft $k$, common to the whole of them, the said shaft being driven from any convenient motor. The lower end of each cell $c$ is closed by a plate of such a contour as enables the rotating screw or helical cutter $d'$ to practically scrape off all the particles of solid paraffine from its inner surface, and the upper end of each of such cells is left open, and is situated beneath one of the inlets $l$, formed through the lower plate, $m$, of the reservoir $n$. The upper end of each cell $c$ is made slightly narrower than the lower end, so that the slab of cooled paraffine may more certainly slip downward as its base is sheared away and discharged by the action upon it of the screw or helical cutter $d'$. The reservoir $n$ is supported upon the upper end of the battery of cells $c$ and $d$, and the holes therein, which constitute the inlets to the vessels $c$, are normally closed by plugs attached to the lower ends of the rods $o$, upon the drawing up of one of which a quantity of paraffine-oil which is contained in the said reservoir is discharged down into that particular cell $c$ over which the said plug has been removed, and upon the requisite amount of oil being so discharged the plug is replaced in its normal position; or, in place of thus intermittently charging the paraffine-oil into the cells c, the area of the inlets l being of the required dimension, or adjustably so, by a valve, the paraffine-oil may be continuously charged thereinto in an unbroken stream.

The reservoir n is provided with one, two, or more auxiliary rods, o', and their connected plugs at one end thereof, which provide for the flushing or cleaning out of the said reservoir, or for the application of additional cells c to an existing battery.

The several spaces d between the cells c being hermetically closed in, constitute vessels d, wherein is contained the water or other medium employed for the cooling and crystallization of the paraffine-oils contained in the adjacent or interposed cells c. In the example represented upon the annexed drawings water is represented as being the medium so employed. For the most advantageous circulation of the water it is continuously introduced cold into the vessels d at the lowest part thereof, and the said water is run off, warmed by the heat given up by the surrounding cooling-oils at the highest part of the said vessels d. These provisions are represented upon the annexed drawings—the cold-water inlets at q, Fig. 1, and the outlets at p, which are arranged at the two ends of each such vessel d. The inlets q are all connected to the cold-water main t, and the outlets p, which are each provided with a valve or cock, s, are connected to the pipes r, by which the discharged water may be conducted to any required outlets. The solidified portions, together with any minute quantity of liquid or semi-fluid portions of paraffine, after being forced out from the cells c by the rotating screws or helical cutters d', as hereinbefore described, are by the conjoined action of the said cutters d' and pump u passed down the pipe v and forced through the pipes w into the filter-presses x, wherein the solid and the said minute liquid portions thereof are separated in the manner commonly practiced with filter-presses.

The pump u and filter-presses x being well known, and therefore constituting no separate part of my present invention, I have deemed it unnecessary to enter into any description of these parts, as my mechanism, performing functions similar to those of the said apparatus shown upon the annexed drawings, may be used in combination with the parts of the apparatus constituting my present invention.

As the greater part of the heat of the oil and paraffine is abstracted, under the foregoing arrangement of apparatus, through the large vertical sides of the cells c, the length of time taken to reduce the mean temperature of the mass to a given point will depend principally on two factors, first, the difference of temperature of the oil and of the cooling medium, and, second, the width of the cells c, or the thickness of the mass to be cooled. I have found that a mean thickness of such mass of about twelve inches gives good results with certain oils; but variations above and below this dimension are employed when it is desired to cool more or less slowly.

I desire it to be understood, although I have hereinbefore described and shown upon the annexed drawings a particular form of apparatus for effecting the separation of solid paraffine from oil, that without departing from the essential features of my invention I may vary the same in many ways. For example, in place of the outlets from the cells c being in the position in which they are represented at Fig. 1, I may form them in the bottom plates of such cells, close to the discharge ends of the rotating screws or helical cutters d'. In this case a ground-plug may be substituted for the sluice-valve g.

In place of using the rotating screws or helical cutters d', fluted rollers or their equivalents may be arranged to effect the discharge of the solidified paraffine.

I claim—

1. In a device for separating solid paraffine from oil, the combination of a refrigerating-cell made larger at the bottom than at the top, and a helical cutter located in the bottom of said cell, the said helical cutter being of a diameter equal or nearly equal to the width of the slab of paraffine to be sheared.

2. The combination, with a refrigerating-cell and a filter or separator, of pipes connecting said refrigerating-cell and filter, the said cell being fitted with a helical cutter which breaks up and forces the refrigerated material into said pipes, and a pump for forcing it therefrom and into the filter, as set forth.

3. The combination of a refrigerating-cell and a helical cutter located in the bottom thereof, the pitch of the said helical cutter increasing toward the delivery end, as set forth.

In testimony whereof I have signed my name to this specification in the presence of two subscribing witnesses.

GEORGE THOMAS BEILBY.

Witnesses:
 ST. JOHN VINCENT DAY,
 HENRY HART,
  Both of 115 St. Vincent St., Glasgow.